(12) United States Patent
Zhang et al.

(10) Patent No.: US 10,630,401 B2
(45) Date of Patent: Apr. 21, 2020

(54) INTERFERENCE DISCOVERY FOR CABLE MODEMS

(71) Applicant: Futurewei Technologies, Inc., Plano, TX (US)

(72) Inventors: Li Zhang, Santa Clara, CA (US); Xiaolong Zhang, Santa Clara, CA (US); James Jeng Chen, Corona, CA (US); Lifan Xu, Santa Clara, CA (US); Fan Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 18 days.

(21) Appl. No.: 15/701,805

(22) Filed: Sep. 12, 2017

(65) Prior Publication Data

US 2018/0076910 A1    Mar. 15, 2018

Related U.S. Application Data

(60) Provisional application No. 62/393,891, filed on Sep. 13, 2016.

(51) Int. Cl.
| | |
|---|---|
| *H04B 17/24* | (2015.01) |
| *H04B 15/00* | (2006.01) |
| *H04L 12/18* | (2006.01) |
| *H04L 5/00* | (2006.01) |
| *H04B 3/487* | (2015.01) |
| *H04L 5/14* | (2006.01) |

(52) U.S. Cl.
CPC ............ *H04B 17/24* (2015.01); *H04B 3/487* (2015.01); *H04B 15/00* (2013.01); *H04L 5/0007* (2013.01); *H04L 5/14* (2013.01); *H04L 12/18* (2013.01)

(58) Field of Classification Search
CPC ........ H04B 15/00; H04B 17/24; H04B 3/487; H04B 3/462; H04L 12/18; H04L 5/0007; H04L 5/14
See application file for complete search history.

(56) References Cited

U.S. PATENT DOCUMENTS

| | | | |
|---|---|---|---|
| 7,349,430 B1 | 3/2008 | Chapman | |
| 8,310,940 B2* | 11/2012 | Jones | H04L 43/50 |
| | | | 348/192 |
| 9,531,562 B2* | 12/2016 | Currivan | H04L 5/0007 |
| 10,009,191 B2* | 6/2018 | Currivan | H04B 3/46 |
| 10,033,542 B2* | 7/2018 | Jin | H04L 1/004 |
| 10,135,490 B2* | 11/2018 | Chapman | H04L 12/2801 |

(Continued)

OTHER PUBLICATIONS

"DOCSIS® 3.1—Physical Layer Specification EC: PHYv3.1-R-17.17771-3", Proposed FDX ED including new Annex F to CM-SP-PHYv3.1-I11, (2017), 1-81.

(Continued)

*Primary Examiner* — Ahmed Elallam
(74) *Attorney, Agent, or Firm* — Schwegman Lundberg & Woessner, P.A.

(57) ABSTRACT

A method implemented by a cable modem of a cable network includes sending an upstream test signal during at least one frequency division duplex minislot assigned to the cable modem, receiving other upstream test signals from other cable modems, measuring interference in each received test signal from the other cable modems, and reporting the interference measurement for each received test signal to a cable modem termination system.

23 Claims, 13 Drawing Sheets

(56) References Cited

U.S. PATENT DOCUMENTS

| | | | |
|---|---|---|---|
| 10,148,408 B2* | 12/2018 | Hamzeh | H04L 5/1469 |
| 10,333,616 B1* | 6/2019 | Zinevich | H04L 1/248 |
| 10,461,806 B2* | 10/2019 | Zhang | H04B 3/48 |
| 2010/0309805 A1* | 12/2010 | Jones, Jr. | H04L 12/2801 |
| | | | 370/252 |
| 2013/0004179 A1* | 1/2013 | Nielsen | H04B 3/50 |
| | | | 398/115 |
| 2013/0114480 A1 | 5/2013 | Chapman et al. | |
| 2014/0010269 A1 | 1/2014 | Ling et al. | |
| 2014/0150047 A1 | 5/2014 | Rakib | |
| 2014/0282783 A1* | 9/2014 | Totten | H04L 12/2885 |
| | | | 725/111 |
| 2014/0294052 A1* | 10/2014 | Currivan | H04B 3/46 |
| | | | 375/224 |
| 2015/0222358 A1* | 8/2015 | Totten | H04L 12/2885 |
| | | | 398/99 |
| 2017/0019241 A1* | 1/2017 | Jin | H04L 5/1461 |
| 2017/0019242 A1* | 1/2017 | Jin | H04L 5/1461 |
| 2017/0093555 A1* | 3/2017 | Hamzeh | H04L 5/1469 |
| 2017/0104522 A1* | 4/2017 | Zinevich | H04B 10/071 |

OTHER PUBLICATIONS

"International Application No. PCT/CN2017/101532, International Search Report and Written Opinion dated Dec. 21, 2017", (Dec. 21, 2017), 11 pgs.

\* cited by examiner

IG DISCOVERY RB OR MAP
TEST INFORMATION ELEMENT DEFINITION

| FIELD | LENGTH | DEFINITION |
|---|---|---|
| SID | 14BITS | RANGING SID FOR CM ASSIGNED TO USE FOR TESTING. |
| RSVD | 2BITS | RESERVED FIELD, SET VALUE OF 0. |
| TEST FRAME START OFFSET | 8BITS | FRAME OFFSET FROM THE BEGINNING AT THE ALLOCATION START TIME OF THIS MAP; THIS INDICATES THE FIRST FRAME FOR WHICH THIS TEST IE IS APPLICABLE. A VALUE OF ZERO INDICATES THE FIRST PROBE FRAME OF THE MAP. |
| TEST FRAME LENGTH | 2BITS | THE NUMBER OF CONSECUTIVE FRAMES IN THIS ALLOCATED TO A CM. IF THE VALUE IS 0, IT INDICATES ONE FRAME, IF THE VALUE IS 1, IT INDICATES TWO CONSECUTIVE FRAMES. |
| MINISLOT OFFSET IN FRAME | 8BITS | STARTING MINISLOT OFFSET FROM THE BEGINNING OF THE FRAME SPECIFIED IN EACH TEST FRAME OFFSET FIELD ; THIS INDICATES THE START MINISLOT POSITION FOR TESTING IN THIS MAP ALLOCATED TO A GIVEN CM. |
| MINISLOT LENGTH | 8BITS | THE NUMBER OF CONSECUTIVE MINISLOTS IN A FRAME SPECIFIED IN THE TEST FRAME OFFSET FIELD ALLOCATED TO A CM. IF THE VALUE IS 0, IT INDICATES ONE FRAME, IF THE VALUE IS 1, IT INDICATES TWO CONSECUTIVE FRAMES. |
| RSVD | 8BITS | RESERVED FIELD, SET VALUE OF 0. |
| POWER | 8BITS | THIS VALUE IS USED TO DEFINE THE TRANSMISSION POWER FOR A GIVEN CM WHEN TRANSMITTING US TEST SIGNAL IN THE SPECIFIED MINISLOTS. |

FIG. 7

INTERFERENCE DISCOVERY FOR CABLE MODEMS

CROSS-REFERENCE TO RELATED APPLICATION

This application claims priority to U.S. Provisional Application Ser. No. 62/393,891 (Interference Discovery for Cable Modems, filed Sep. 13, 2016) which is incorporated herein by reference.

FIELD OF THE INVENTION

The present disclosure is related to discovering cable modem interference groups.

BACKGROUND

Cable modems receive signals from a server, such as video signals and other data on a downstream portion of a frequency spectrum. The server is typically called a cable modem termination system (CMTS), which is coupled to the cable modems via a hybrid fiber and coaxial cable (HFC) network. The downstream portion is typically in the range with a lower frequency of 108 to 258 MHz and an upper frequency of 1218 to 1794 MHz. The cable modems also provide data back to the server on an upstream portion of the frequency spectrum. The division of the spectrum is referred to as frequency division duplex, which utilizes different portions of the spectrum for upstream and downstream communications, which when used simultaneously is referred to as full duplex. The upstream portion has a frequency range that is typically 5 Mhz to 85 or 204 MHz, depending on the downstream portion of the spectrum being used. The upstream portion and downstream portion of the spectrum may be simultaneously used for transmissions downstream and upstream.

In full duplex cable modem systems, there can be interference between different modems. To minimize the interference, constraints have been placed on the cable modems, such as a modem receiving on a channel cannot transmit on that channel, but other sufficiently radio frequency (RF) isolated modems may transmit on that channel. Intelligent scheduling by the CMTS may also be utilized to minimize such interference. Still further, cable modems may be assigned to various transmission groups to minimize interference.

Protocols for implementing communications in cable systems are described in a DOCSIS® family of specifications developed by Cable Television Laboratories (CableLabs). The family of specifications defines a fifth generation of high-speed data-over-cable systems, commonly referred to as the DOCSIS 3.1 specifications.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a method is implemented by a cable modem of a cable network. The method includes sending an upstream test signal during at least one frequency division duplex minislot assigned to the cable modem, receiving other upstream test signals from other cable modems of the cable network, measuring interference in each received test signal from the other cable modems, and reporting the interference measurement for each received test signal to a cable modem termination system.

Optionally, in any of the preceding aspects, a further implementation of the aspect provides that the interference measurement comprises a receive modulation error ratio (RxMER) value with interference and without interference.

Optionally, in any of the preceding aspects, a further implementation of the aspect provides that the interference measurement comprises a capture symbol.

Optionally, in any of the preceding aspects, a further implementation of the aspect includes receiving an interference group test granted transmission MAP message allocating minislots located in an Orthogonal Frequency Division Multiple Access (OFDMA) symbol prior to broadcasting the upstream test signal.

Optionally, in any of the preceding aspects, a further implementation of the aspect includes parsing the interference group test granted transmission MAP message to determine at least one minislot to use for broadcasting the upstream test signal.

Optionally, in any of the preceding aspects, a further implementation of the aspect provides that reporting the measure of interference for each received test signal is sent in a report message.

According to another aspect of the present disclosure, a cable modem of a cable network includes a memory storage comprising instructions and a processor in communication with the memory. The processor executes the instructions to send an upstream test signal during at least one frequency division duplex minislot assigned to the cable modem, receive other broadcast upstream test signals from other cable modems of the cable network, measure interference in each received test signal from the other cable modems, and report the interference measurement for each received test signal to a cable modem termination system.

Optionally, in any of the preceding aspects, a further implementation of the aspect provides that the interference measurement comprises a receive modulation error ratio (RxMER) value with interference and without interference.

Optionally, in any of the preceding aspects, a further implementation of the aspect provides that the interference measurement comprises a capture symbol.

Optionally, in any of the preceding aspects, a further implementation of the aspect includes the processor further executing the instructions to receive an interference group test granted transmission MAP message allocating minislots located in an Orthogonal Frequency Division Multiple Access (OFDMA) symbol prior to broadcasting the upstream test signal.

Optionally, in any of the preceding aspects, a further implementation of the aspect includes the processor further executing the instructions to parse the interference group test granted transmission MAP message to determine at least one minislot to use for broadcasting the upstream test signal.

Optionally, in any of the preceding aspects, a further implementation of the aspect provides that reporting the interference measurement for each received test signal is sent in a report message.

According to a further aspect of the present disclosure, cable modem of a cable network includes a memory storage comprising instructions, a communication device configured to couple to the cable network, and a processor in communication with the memory and the communication device. The processor executes the instructions to send an upstream test signal during at least one frequency division duplex minislot assigned to the cable modem, receive other broadcast upstream test signals from other cable modems of the cable network, measure interference in each received test signal from the other cable modems, and report the measure of interference for each received test signal to a cable modem termination system.

Optionally, in any of the preceding aspects, a further implementation of the aspect provides that the interference measurement comprises a receive modulation error ratio (RxMER) value with interference and without interference.

Optionally, in any of the preceding aspects, a further implementation of the aspect provides that the interference measurement comprises a capture symbol.

Optionally, in any of the preceding aspects, a further implementation of the aspect includes the processor further executing the instructions to receive an interference group test granted transmission MAP message allocating minislots located in an Orthogonal Frequency Division Multiple Access (OFDMA) symbol prior to broadcasting the upstream test signal.

Optionally, in any of the preceding aspects, a further implementation of the aspect includes the processor further executing the instructions to parse the interference group test granted transmission MAP message to determine at least one minislot to use for broadcasting the upstream test signal.

Optionally, in any of the preceding aspects, a further implementation of the aspect provides that the reporting of the interference measurement for each received test signal is sent in a report message.

According to one aspect of the present disclosure, a method includes broadcasting an interference group test granted transmission MAP to multiple cable modems coupled to each other via a cable network, causing each of the multiple cable modems to perform as a signaling cable modem transmitting a test signal in at least one minislot responsive to the interference group test granted transmission MAP, wherein each of the multiple cable modems transmits a test signal in corresponding assigned minislots in the MAP, and receiving reports from the multiple cable modems representative of interference detected responsive to the test signals from the multiple cable modems, wherein interference groups are assignable based on the received reports.

Optionally, in any of the preceding aspects, a further implementation of the aspect provides that the minislots are located in an Orthogonal Frequency Division Multiple Access (OFDMA) symbol.

Any one of the foregoing examples may be combined with any one or more of the other foregoing examples to create a new embodiment within the scope of the present disclosure.

BRIEF DESCRIPTION OF THE DRAWINGS

FIG. 7 is a table that includes test information element field definitions corresponding to an IG discovery MAP according to an example embodiment.

DETAILED DESCRIPTION

Figure 1:
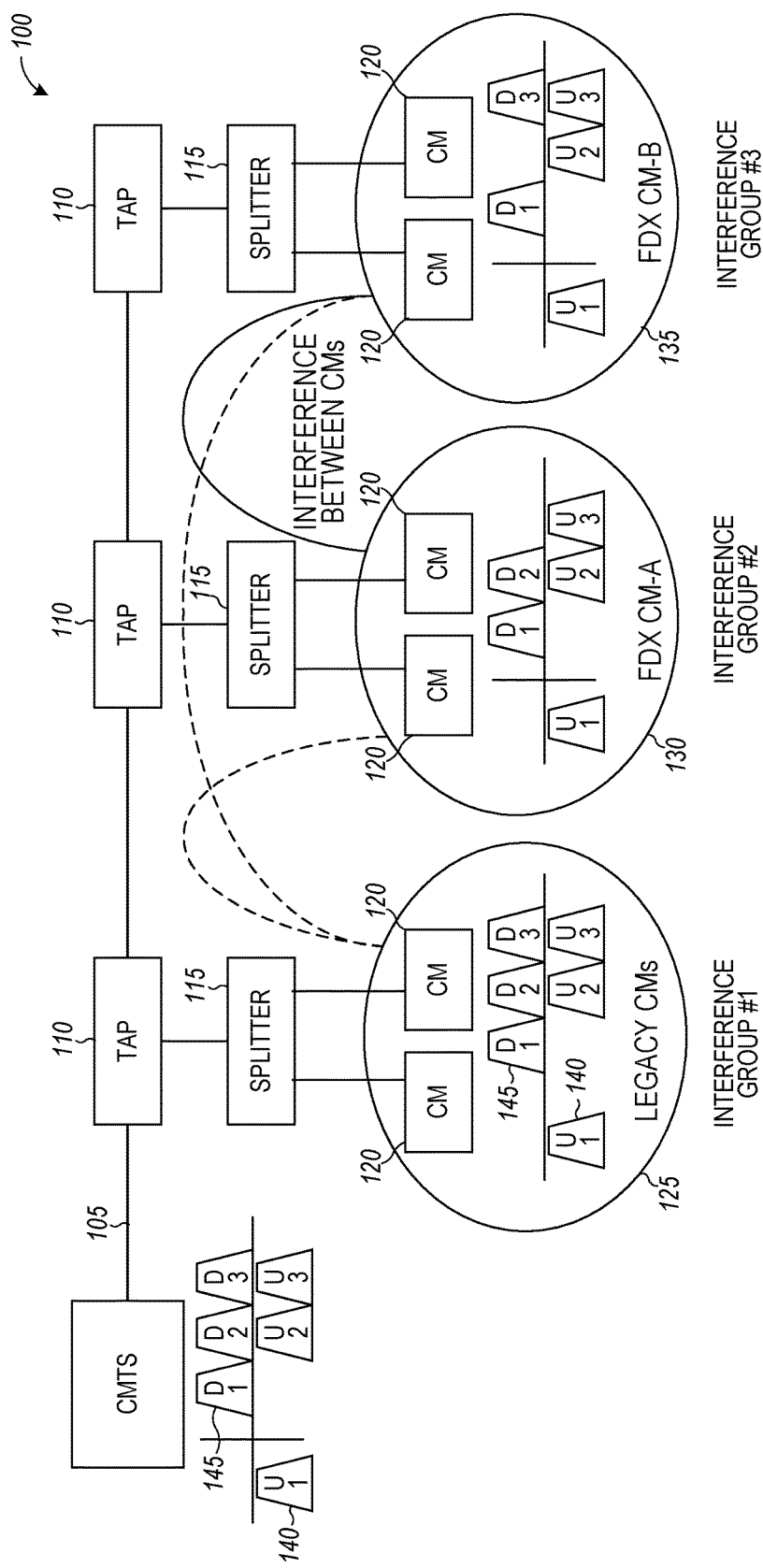
FIG. 1 is a block diagram of a cable system divided into different interference groups according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Current protocols for implementing communications in cable systems are described in a DOCSIS® family of specifications developed by Cable Television Laboratories (CableLabs). The family of specifications defines a fifth generation of high-speed data-over-cable systems, commonly referred to as the DOCSIS 3.1 specifications.

Cable modems receive signals from a server, such as video signals and other data on a downstream portion of a frequency spectrum. The server is typically called a cable modem termination system (CMTS), which is coupled to the cable modems via a hybrid fiber and coaxial cable (HFC) network.

In full duplex (FDX) cable modem (CM) systems, there can be interference between different cable modems. To minimize the interference, cable modems may be assigned to various interference groups (IGs) based on isolation loss. The cable modem may work on a frequency division duplex (FDD) mode, but different interference groups will run using different spectrum profiles, while the CMTS works in full duplex.

Within an IG, the CMTS schedules traffic so that the US (Transmit) of one CM will not interfere with the DS (Receive) of its neighbor. The CMTS identifies "noisy neighbors" and forces them to get along. Within an IG, CMs shall not transmit and receive at the same time on the same frequency.

At any point in time, a CM is either transmitting or receiving on a DOCSIS channel. While a CM is receiving on a channel in DS, other CMs can transmit on the same channel in US. A typical IG can be a tap group (a group of CMs coupled to a same tap) and may contain 1 to 8 CMs within a TAP group. However, an IG is not limited to cover one TAP group. Multiple CMs in multiple TAP groups may be assigned to the same IG.

To discover interference groups, the CMTS may use a sounding method to measure cable modem isolation and identify interference groups to minimize interference. During such IG discovery, a CM transmits a signal and other CMs measure and report back to the CMTS. CMs that are close enough for transmission to interfere with reception by another CM are sorted into the same interference group. A typical interference group is a tap group and may contain one to eight CMs. Such interference groups may be subjected to transmission constraints to minimize interference between the CMs in the IG. At least two IG discovery algorithms have been used, an out-of-band algorithm, and an in-band algorithm.

The interference measurement classically involves a receive modulation error ratio (RxMER) conducted by each CM usually using an average sliding window method to measure the MER. When measured under interference, the measurement may be impacted by historical MER values, which do not suffer from interference. The impact may lead to long duration tests in order to obtain sufficient data to derive proper interference groups. One proposed interference test utilizes a slow start/stop procedure due to the assumption that a long period of time would be needed to obtain a suitable MER measurement. However, the inventors have discovered that such a long time is not needed.

Using a frequency division duplex minislot approach, the CMTS assigns a set of subcarriers for use in interference group testing and sets subscribers to zero bit-loading or exclusion band in a downstream (DS) channel. The CMTS allocates the IG minislots to each test CM and indicates the allocation of a DOCSIS bandwidth allocation map (MAP) message. In one embodiment, minislots are grouped with subcarriers (8 subcarriers in a minislot) and subcarriers are grouped to form a symbol (or a symbol consists of many mini-slots). The test CM sends an upstream (US) test signal in the one or more assigned IG testing minislot, and the other (measure) CMs monitor the RxMER or capture symbol at the same time. The measure CMs may initially report the RxMER with interference and without interference in one message in an assigned timeslot when the measurement has been completed.

In various embodiments, a CMTS scheduler allocates an IG discovery signal dynamically in assigned minislots which can be allocated to an US/Transmit test signal performed by a CM while all other CMs are listening and reporting to the CMTS. In DOCSIS 3.1 OFDMA (orthogonal frequency-division multiple access) applications, a group of dedicated subcarriers, all with the same modulation order within a minislot, are allocated for upstream transmission by a given cable modem. A cable modem may be assigned one or more minislots in a transmission burst by the CMTS scheduler. The modulation order may differ from one minislot to another.

The CMTS broadcasts the test CM's US/Transmit signal residing in a minislot location with power level assignment to all other CMs with IGD-MAP (Interference Group Discovery MAP). A given CM sends a US test signal in the assigned IG discovery minislot. In a first option, all other CMs record the burst RxMER from assigned IG discovery minislot, and report both the RxMER with interference and without interference to the CMTS. In a second option, the measuring CMs capture a DOCSIS 3.1 OFDM DS symbol to measure RxMER.

FIG. 1 is a block diagram of a cable system 100 showing a CMTS coupled via upstream and downstream communication lines 105 to taps 110 and splitters 115 to multiple different CMs 120. The CMs 120 are divided into different interference groups indicated at 125, 130, and 135 based on interference group testing. CMs 120 in the same interference group may have small isolation losses, such as 20 dB, but CMs 120 from different interference groups may have larger isolation losses, such as 60-80 dB. The CMs 120 work in frequency division duplex (FDD) mode, but different IGs run in different spectrum profiles such that the CMTS operates in full duplex (FDX) mode. Upstream and downstream communications are represented by pyramid shaped blocks such as at 140 and 145 respectively.

Figure 2:
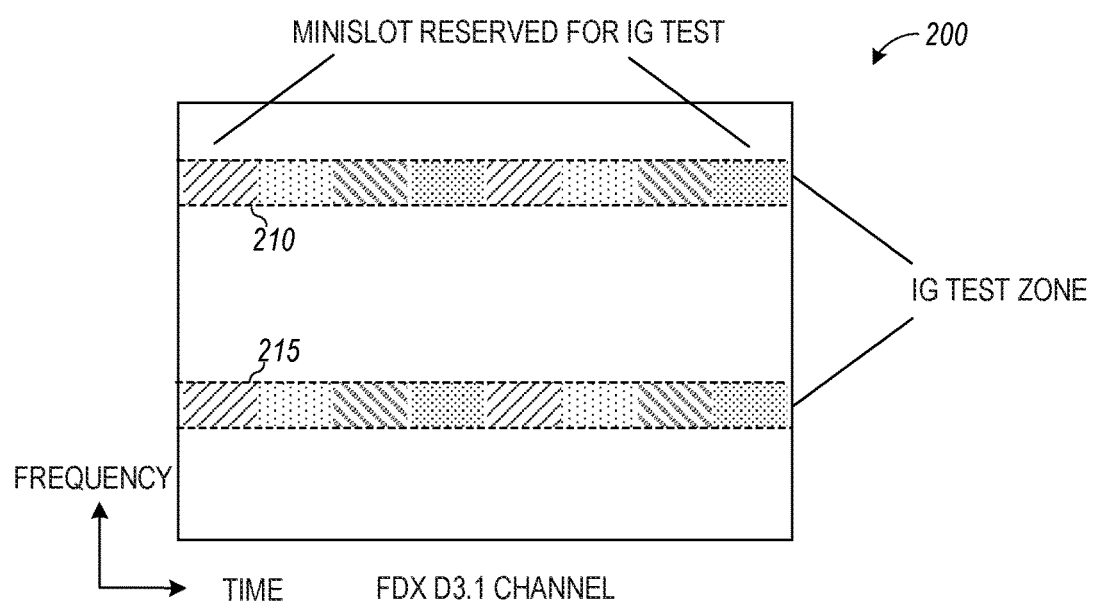
FIG. 2 is block diagram illustrating a set of subcarriers for interference group testing according to an example embodiment.

FIG. 2 illustrates a set of subcarriers used for interference group testing to discover IGs generally at 200 in one embodiment. The subcarriers comprise minislots 210 and 215 that are frequency division duplex multiplexed and used by each CM by cycle, which is aligned with a data minislot allocation cycle.

During IG discovery, the CMTS assigns a set of subcarriers used for Interference Group test and sets the subscribers to zero bit-loading or exclusion band in the DS channel. The CMTS should allocate the IG test Resource Block (RB) or minislots allocated in the US channel, to indicate the allocation by DOCSIS CMTS in RB or MAP message. A minislot in DOCSIS 3.1 OFDMA applications is a group of dedicated subcarriers, all with the same modulation order, for upstream transmission by a given cable modem. A cable modem may be assigned one or more minislots in a transmission burst by CMTS scheduler. The RB is a number of subcarriers in the OFDM symbol where the CM or CMTS can allocate RBs for transmit or receive. The test/signaling CM sends US test signal in the assigned testing RB or minislots for all other measuring CMs to monitor and report measured RxMER (Receiving Modulation Error Ratio).

The CMTS scheduler may allocate OFDMA subcarriers in the granted transmission MAP for one or multiple CMs to generate test signals within a test cycle. The CMTS scheduler allocates the RB or minislot in an IG test zone to test CM/CMs (one or multiple CMs) within a test cycle. The cycle length may align to the data minislot allocation cycle.

The CMTS broadcasts or multicasts IG test RB or MAP to each CM, including both test and measure CM. The measuring CM will report RxMER with interference and without interference in one or multiple messages when the measurement is completed.

CMTS allocates IG Discovery Signal dynamically in assigned Resource Block or minislot in the MAP which can be allocated to Transmit test signal/symbol performed by one or multiple CMs while all other CMs are listening and reporting to the CMTS in the same or different test cycles.

CMTS broadcasts or multicasts test CM to send a Transmit signal in assigned RB or minislot location in DOCSIS 3.1 US Channel with IGD-RB or IGD-MAP (Interference Group Discovery RB in DOCSIS 3.1 or Interference Group Discovery MAP located in DOCSIS 3.1 Upstream OFDMA symbol). A given CM sends a test signal in the assigned RB/symbols or minislots in the Upstream channel allocated by the CMTS. All other CMs record the burst RxMER level and report both RxMER with interference and without interference to the CMTS.

Figure 3:
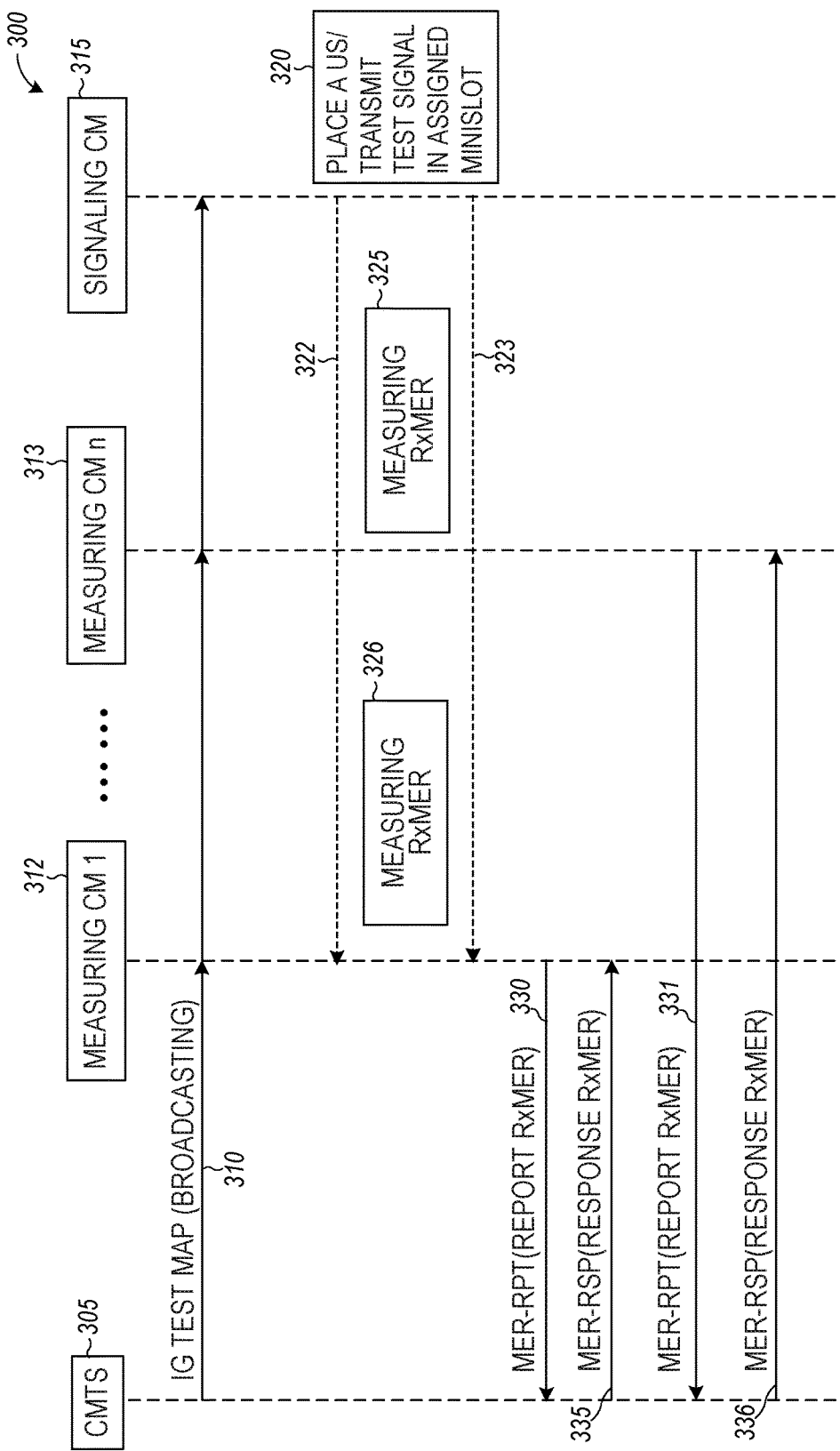
FIG. 3 is a timing diagram indicating timing of an interference group discovery procedure according to an example embodiment.

FIG. 3 is a timing diagram indicating timing of an interference group discovery procedure 300 according to an example embodiment. CMTS 305 begins the procedure at communication 310 by broadcasting an IG test MAP that is received by each of multiple CMs 1-n, a few of which are illustrated at measuring CM 312, measuring CM 313, and signaling CM 315. CM 315 is indicated as a signaling CM. As previously indicated, each CM becomes a signaling CM at different times. At operation 320, the signaling CM 315 places an US transmit test signal in an assigned RB or minislot located in the OFDMA subcarrier(s) determined from the IG test MAP. The minislot or slots is illustrated by broken lines 322 and 323. The other CMs measure interference with the test signal as indicated at operations 325 and 326 and store the result in a local buffer. In some embodiments, the other CMs may also collect the RxMER without interference. The other CMs then generate a report message (MER-RPT) that includes both RxMER values with interference and without interference and provide the report to the CMTS as indicated at communications 330 and 331, and receive responses back at communications 335 and 336 respectively. By the time each CM has had a turn as the signaling CM, the CMTS has sufficient interference information to determine appropriate interference groups to place CMs into.

In FIG. 3, the interference measurement comprises a RxMER, the report is referred to as an MER-RPT, and the response from the CMTS is an MER-RSP.

Figure 4:
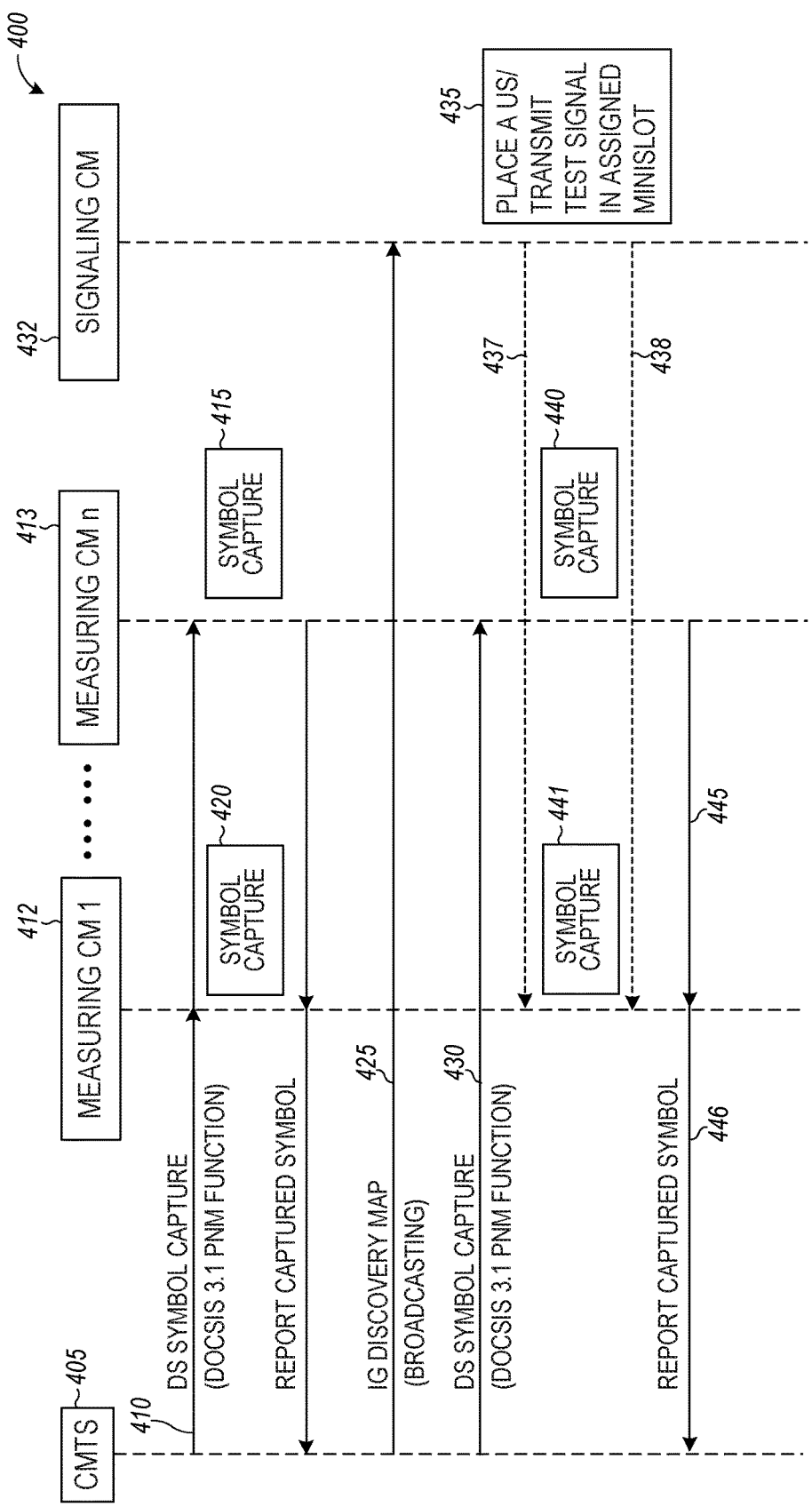
FIG. 4 is a timing diagram of an alternative interference group discovery procedure utilizing symbol capture for an interference measurement according to an example embodiment.

FIG. 4 is a timing diagram of an alternative interference group discovery procedure 400 utilizing symbol capture for an interference measurement. At communication 410, the procedure 400 begins with the CMTS 405 generating a DS symbol capture signal, which in one embodiment may be a DOCSIS 3.1 proactive network maintenance (PNM) Function. Each measuring CM 412, 413 performs a symbol capture and reports it back to the CMTS as indicated at operations 415 and 420. At communication 425, the CMTS generates an IG discovery MAP and broadcasts it to each CM to identify minislots for each CM to use for discovery. The CMTS may then send a DS symbol capture signal at communication 430. Each CM then takes a turn as a signaling CM 432 by placing a US transmit test signal in their assigned minislots, as indicated at operation 435. The minislots are represented by broken lines 437 and 438. The other CMs 412, 413 perform symbol capture as indicated at operations 440 and 441. The other CMs then report captures symbols at communications 445 and 446.

Figure 5:
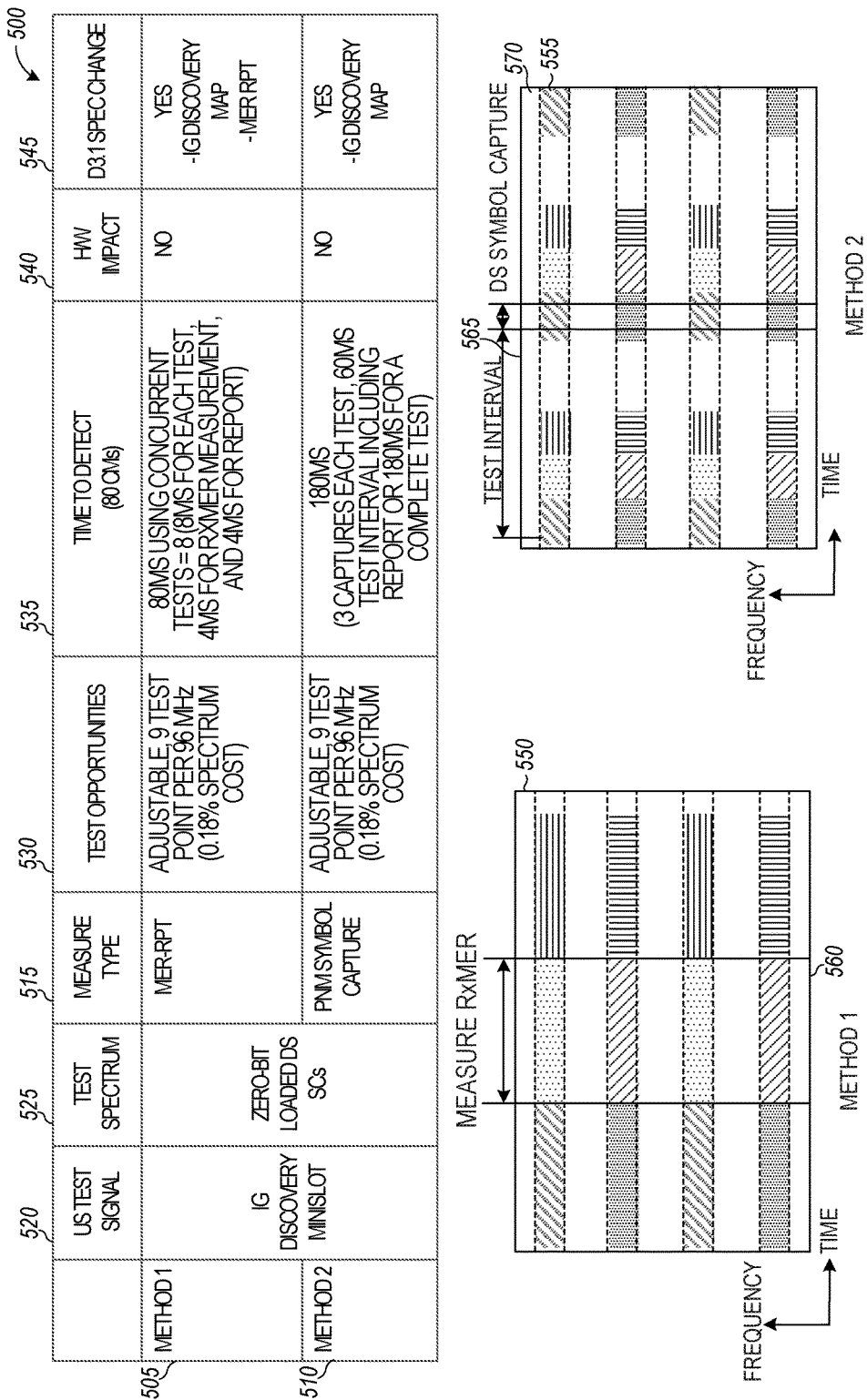
FIG. 5 is a set of charts summarizing example interference group discovery processes according to an example embodiment.

FIG. 5 provides charts summarizing the discovery procedures 300 and 400. A first chart 500 summarizes method 1 corresponding to procedure 300 and method 2 corresponding to procedure 400 in rows 505 and 510 respectively. Method 1 measures MER, while method 2 utilizes PNM symbol capture as indicated in column 515. Both methods utilize an IG discovery minislot for the upstream test signal 520 and a test spectrum 525 of zero-bit loaded DS symbol captures (SCs). Test opportunities 530 are both adjustable with 9 test points per 96 MHz with a 0.18% spectrum cost. A time to detect based on 80 CMs in column 535 was 80 ms for method 1 using concurrent tests=8(8 ms for each test, 4 ms for RxMER measurement, and 4 ms for Report). For method 2, the time to detect was 180 ms (3 captures each test, 60 ms test interval including report or 180 ms for a complete test). No hardware impact is noted for both methods in column 540. Column 545 indicates whether a DOCSIS 3.1 specification change may result. For method 1, yes, IG discovery RB or MAP and MER RPT are added. For method 2, yes, IG discovery RB or MAP is added.

FIG. 5 includes frequency versus time charts 550 and 555 illustrating timing of the interference measurements for both methods respectively. Measurement of the RxMER in method 1 is shown in column 560 in chart 550. Chart 555 shows both the test interval 565 and DS symbol capture at 570. The transmitted signals are made up of sequences of OFDMA frames occupying the modulated bandwidth of the upstream FDX channel. The Receiving CMs measure the MER of all the subcarriers covered by the OFDMA frames. In method 1, referred to as an OUDP (OFDM Upstream Data Profile) method, the transmitting CMs may be legacy DOCSIS 3.1 or FDX, but in one embodiment, the receiving CMs may be limited to FDX.

Figure 6A:
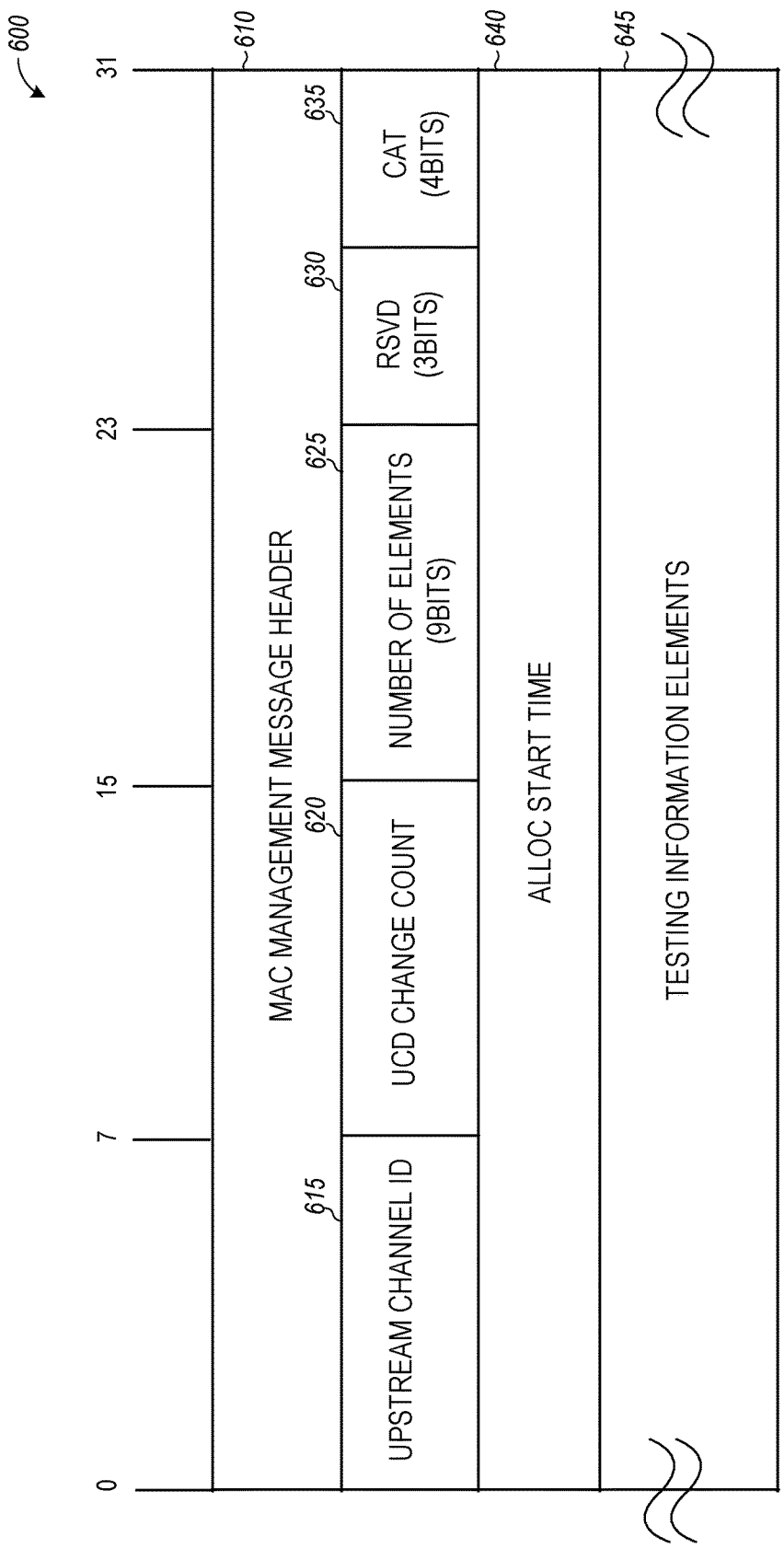
FIGS. 6A and 6B are block diagrams illustrating an interference group discovery MAP message according to an example embodiment.
Figure 6B:
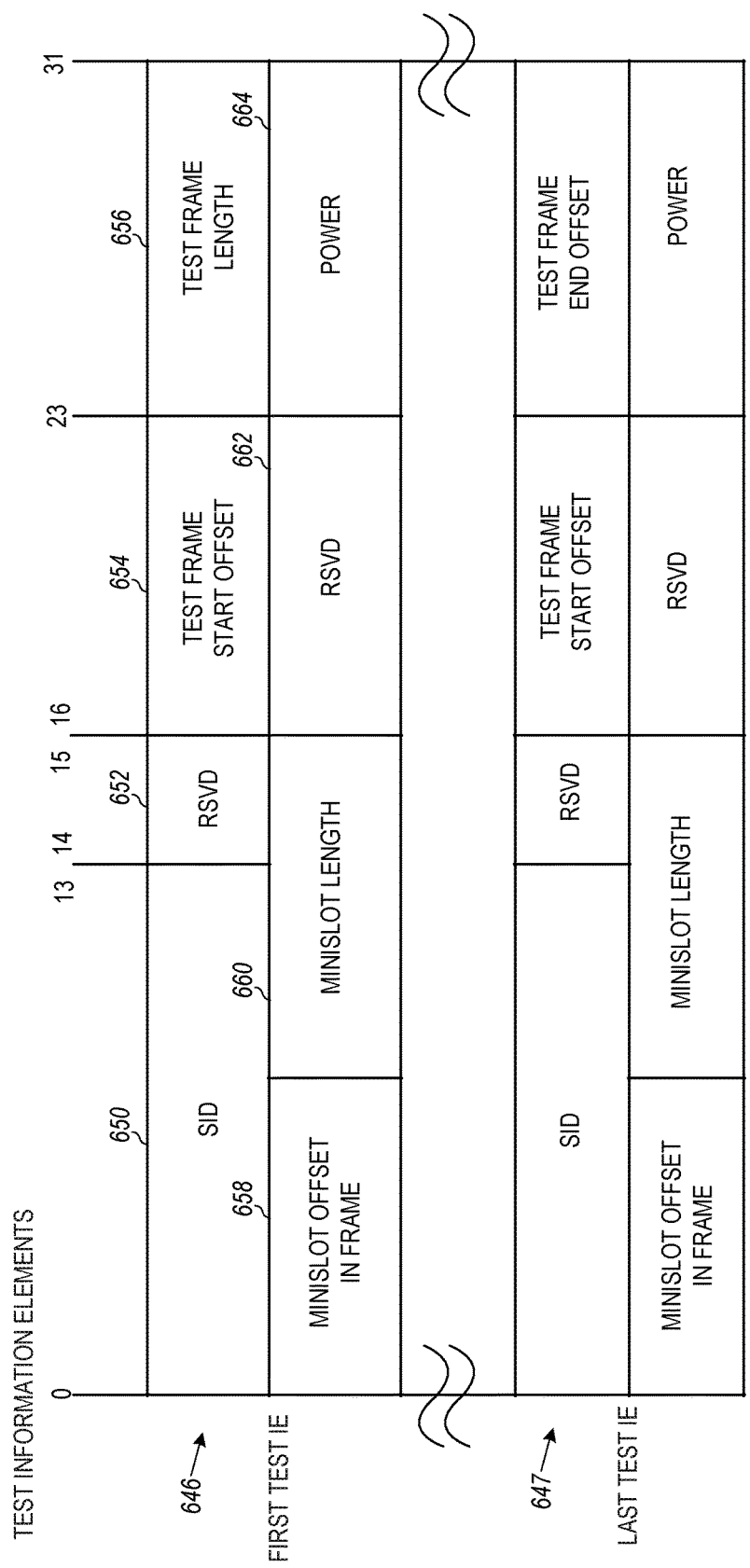

FIGS. 6A and 6B are a block diagram illustrating an IG discovery MAP message 600, including a MAC management message header 610, upstream channel ID 615, UCD (upstream channel descriptor) Change Count 620, number of elements 625, reserved (RSVD) 630, CAT (channel allocation type) 635, and an allocation start time 640. Multiple test IEs 645, 646, and 647 each include a SID (service identifier) 650, reserved 652, test frame start offset 654, test frame length 656, minislot offset in frame 658, minislot length 660, reserved 662, and power bits 664.

FIG. 7 is a table 700 that includes test information element field definitions corresponding to the IG discovery MAP. The numbering for like fields is consistent with the numbering of FIG. 6B. SID (service identifier) 650 is 14 bits in length and is defined as a ranging SID for CM assigned to use for testing. Reserved 652 is 2 bits, and is a reserved field with a set value of 0. Test frame start offset 654 is 8 bits and is a frame offset from the beginning at the allocation start time of this MAP. The offset indicates the first frame for which this TEST-IE is applicable. A value of zero indicates the first probe frame of the MAP. Test frame length 656 is 2 bits and identifies the number of consecutive frames in this map allocated to a CM. If the value is 0, it indicates one frame, if the value is 1, it indicates two consecutive frames. The minislot offset in frame 658 is 8 bits that identify the starting minislot offset from the beginning of the frame specified in each Test Frame Offset Field that indicates the start minislot position for testing in this MAP allocated to a given CM. Minislot length 660 is 8 bits that specify the number of consecutive minislots in a frame specified in the Test Frame offset Field allocated to a CM. A value of 0 indicates one frame, the value 1 indicates two consecutive frames. Reserved 662 is 8 bits with a set value of 0. Power bits 664 is 8 bits used to define the transmission power for a given CM when transmitting the US test signal in the specified minislots.

Figure 8A:
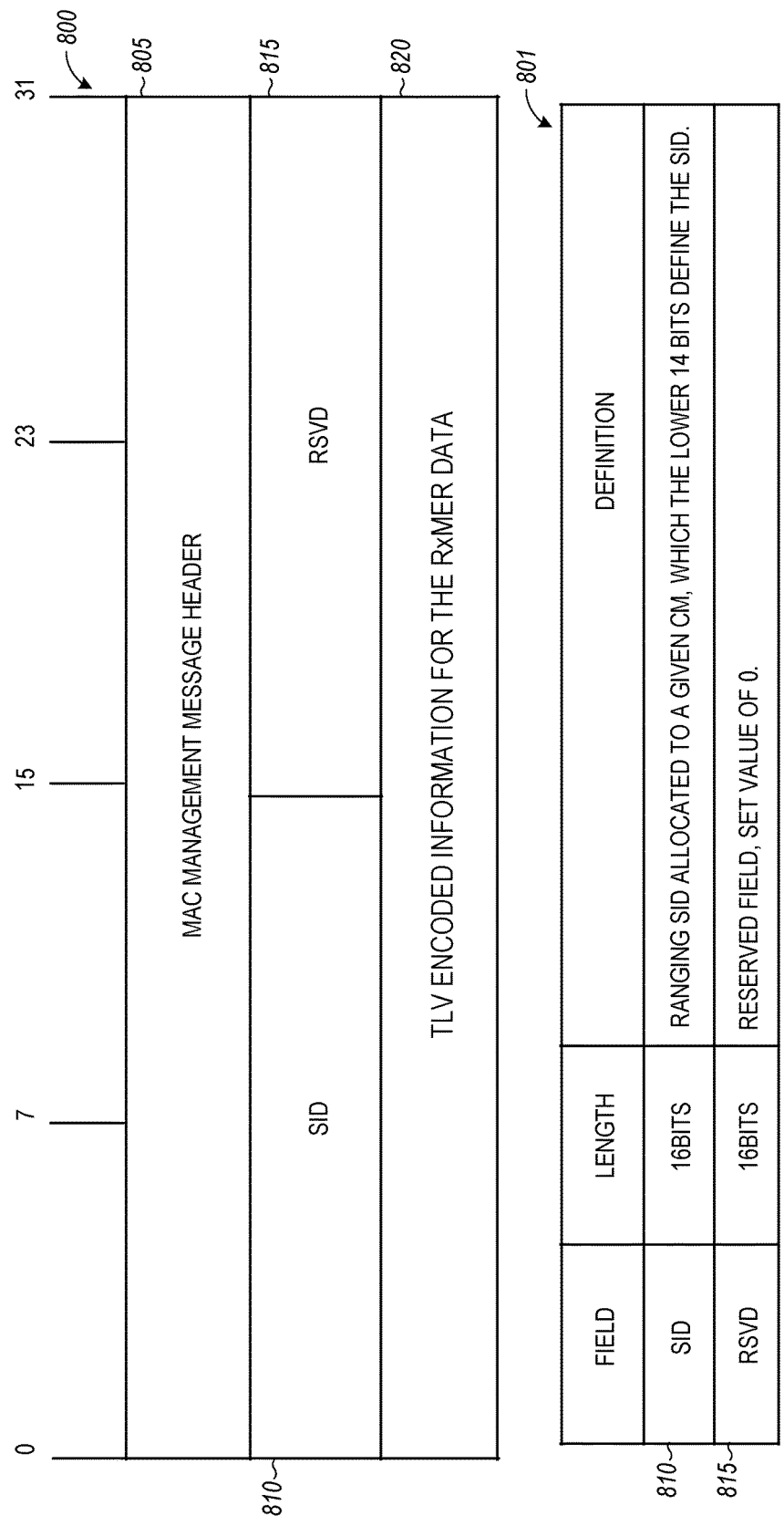
FIGS. 8A, 8B, and 8C include tables illustrating a modulation error ratio report (MER-RPT) and a modulation error ratio response (MER-RSP) message formats and field definitions according to an example embodiment.
Figure 8B:
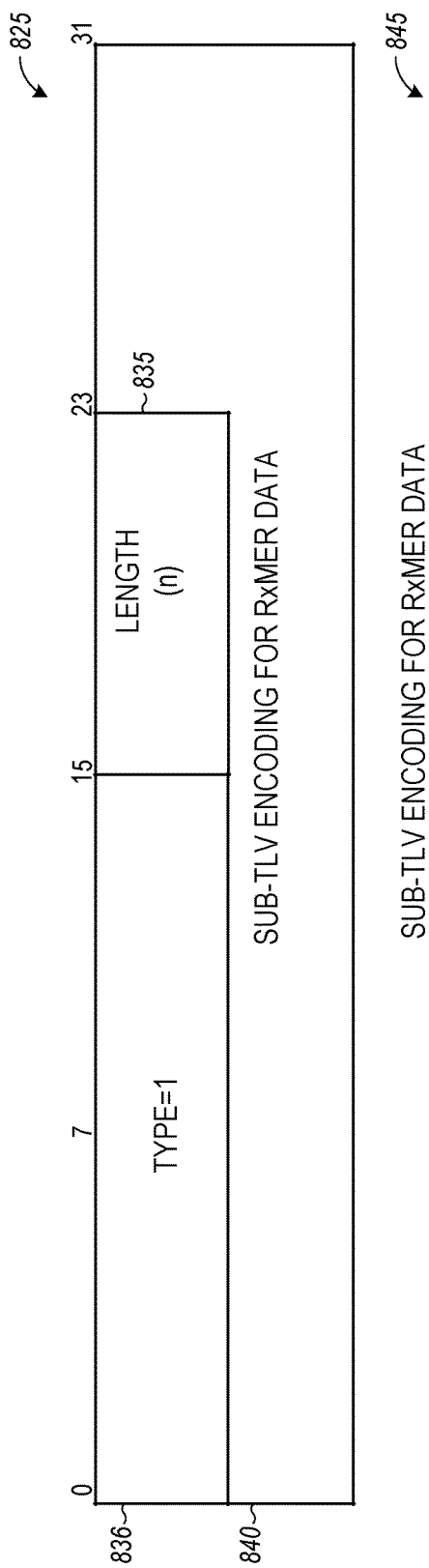
Figure 8C:
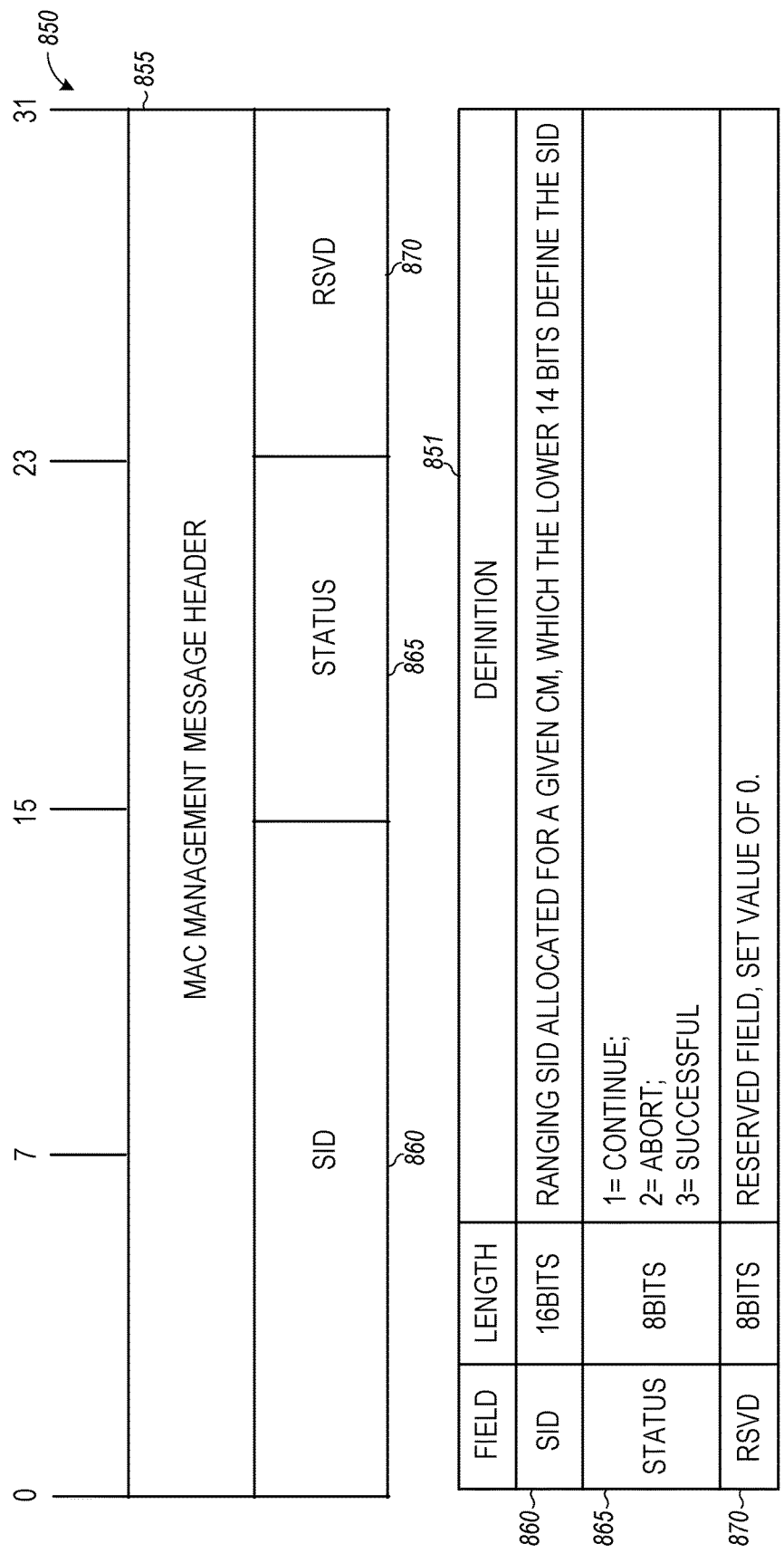

FIGS. 8A, 8B, and 8C include tables illustrating the MER-RPT and MER-RSP message formats and field definitions. In FIG. 8A, a report message (MER-RPT) for IG discovery signaling protocol is illustrated at 800. Corresponding field descriptions with common reference number for the fields is shown at 801. A MAC management message header is shown at 805. SID field 810 is 16 bits in length and provides a ranging SID allocated to a given CM. The lower 14 bits define the SID. RSVD 815 is 16 bits that are a reserved field with a set value of 0. TVL encoded information for the RxMER data is shown at 820.

FIG. 8B illustrates RxMER data TLV encoding 820 fields at table 825. Note that the length is specified in 2 byte increments. A type field 830 specifies that the type=1. A length field 835 specifies length (n). Sub=TLV encoding for RxMER data is shown at 840 with further definitions at table 845. An SID 846 is of type 1.1 with a length of 2. SID 846 is a ranging SID indicated in the T-MAP which allocated to the CMs. An upstream channel ID 847 is of type 1.2 with length 1 and identifies an upstream channel in which measures of the RxMER correspond to the SID. RxMER per subcarrier 848 is of type 1.3 with length N and specifies integer modulation error ratio measurements in 0.25 dB steps (0x00-0xFE represent 0-63.5 dB; 0xFF indicates no measurement available). The measurements are encoded as a packed sequence of 8-bit values for N consecutive subcarriers (N≤3940) from lowest active subcarrier to the highest active subcarrier, including all the subcarriers in between.

In FIG. 8C, a response message for IG discovery signaling protocol is illustrated at 850. Corresponding field descriptions with common reference number for the fields are shown at 851. A MAC management message header is shown at 855. SID field 860 is 16 bits in length and provides a ranging SID allocated to a given CM. The lower 14 bits define the SID. A status 865 is 8 bits in length. A value of 1 represents continue, 2 abort, and 3 successful. RSVD 870 is 8 bits that are a reserved field with a set value of 0.

The use of minislots for interference group discovery may be summarized as follows. The objective, in one embodiment, is to identify the minimum set of CMs that may operate in simplex mode with the CM under test, to bound the co-channel interference and maximize FDX capacity. An interaction between the CMTS and multiple CMs involves a periodic test procedure controlled by the CMTS. During the test period, one CM transmits a signal and other CMs measure and report. Note that each CM transmits at different times or different subcarriers during the test period, with the non-transmitting CMs receiving test signals and generated interference reports. In some embodiments, multiple CMs can simultaneously send test signals at different sub carriers. IG discovery may be performed at CM initialization time before a CM operates in a full duplex (FDX) band. IG discover may also be performed periodically after initialization to allow incremental detection refinement and prompt adaptation to signal environment changes. CMs complying with cable modem specification DOCSIS 3.1 may share the DS resource in the FDX band.

The measured interference received by the CMTS from each CM may be used by the CMTS to group the CMs into interference groups. A CM's Interference Group (IG) includes all the CMs in the service group whose received interfering signal levels caused by the given CM's upstream transmission at a given transmit frequency, are above a designed interference limit. Such interference is known as the US-to-DS co-channel interference associated with the FDX operation.

By definition, a FDX CM has a unique IG at a given US-to-DS co-channel interference limit defined over the FDX spectrum used by the DS channel.

The IGs are used to avoid the US to DS co-channel interference among the CMs via intelligent FDX spectrum resource scheduling. Specifically for a given FDX CM, CMs within its IG operate in non-FDX mode (uni-directional at any particular point of time and frequency) with the specific CM to avoid the US to DS co-channel interference; CMs outside the IG that have sufficient RF isolation therefore can receive on the same DS spectrum when the given CM transmits simultaneously.

IG Discovery is an interference test procedure that allows the CMTS to assess the US-to-DS channel interference level to identify the IG based on a designed interference limit. Specifically, to conduct IG discovery, CMTS commands a CM or a group of CMs to transmit an US test signal at specific frequencies in the FDX band, and instructs other CMs to measure and report the received DS signals at the spectrum where the leaked test signal may present. By analyzing the DS signal measurement together with the information of the test signal generated by the given CMs, the CMTS is able to derive the US-to-DS co-channel interference level and discover the IG for the given CMs.

Figure 9:
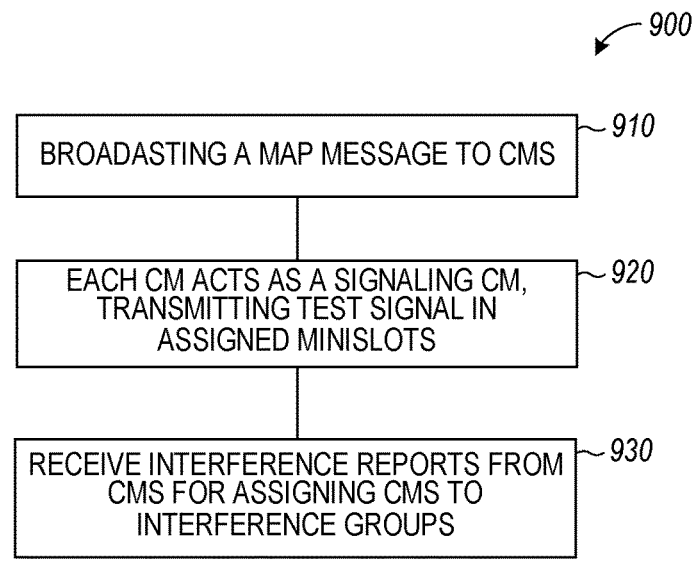
FIG. 9 is a flowchart illustrating a method of detecting interference between cable modems (CMs) according to an example embodiment.

FIG. 9 is a flowchart 900 illustrating a method of detecting interference between CMs and reporting of such interference for assigning interference groups. Method 900 includes broadcasting at 910 an interference group test granted transmission MAP to multiple cable modems coupled to each other via a cable network. Each of the multiple cable modems performs as a signaling cable modem at 920, transmitting a test signal in a minislot responsive to the interference group test granted transmission MAP, wherein each of the multiple cable modems transmits a test signal in corresponding assigned minislots in the MAP. Reports are received at 930 from the multiple cable modems representative of interference detected responsive to the test signals from the multiple cable modems. Interference groups are assignable based on the received reports, such as by grouping low SNR CMs and low bit loading CMs into the same interference group. In one embodiment, the minislots are located in an Orthogonal Frequency Division Multiple Access (OFDMA) symbol.

Figure 10:
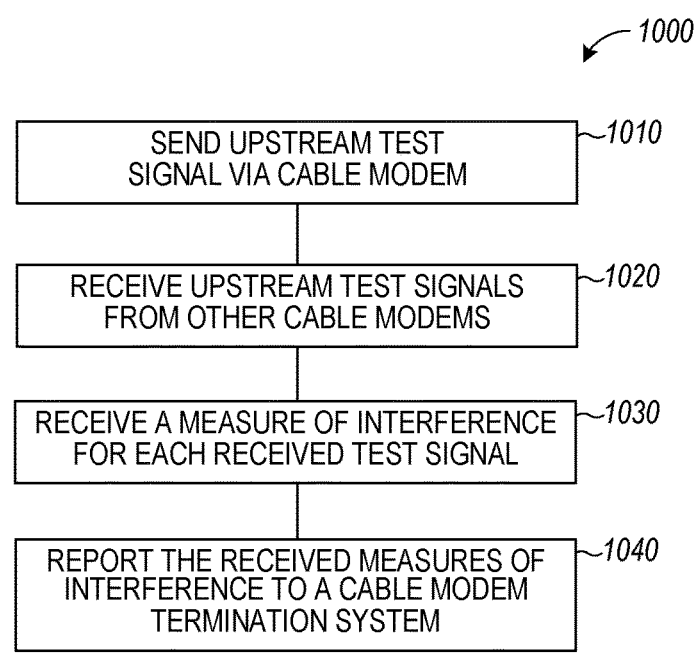
FIG. 10 is a flowchart illustrating a method of measuring and reporting interference between cable modems according to an example embodiment.

FIG. 10 is a flowchart illustrating a method 1000 implementable by a cable modem. Method 1000 includes sending at 1010 an upstream test signal during at least one frequency division duplex minislot assigned to the cable modem. At 1020, upstream test signals are received from other cable modems coupled via a cable network. A measure of interference for each received test signal is received at 1030 from the other cable modems. At 1040 the measure of interference for each received test signal is reported to a cable modem termination system coupled to the cable network. In one embodiment, the measure of interference comprises a receive modulation error ratio (RxMER) value with interference and without interference. In a further embodiment, the measure of interference comprises a capture symbol. In yet a further embodiment, method 1000 includes receiving an interference group test granted transmission MAP message allocating minislots located in an Orthogonal Frequency Division Multiple Access (OFDMA) symbol prior to broadcasting the upstream test signal. The interference group test granted transmission MAP message is parsed to determine at least one minislot to use for broadcasting the upstream test signal. A report message may be used to report the measure of interference for each received test signal.

Figure 11:
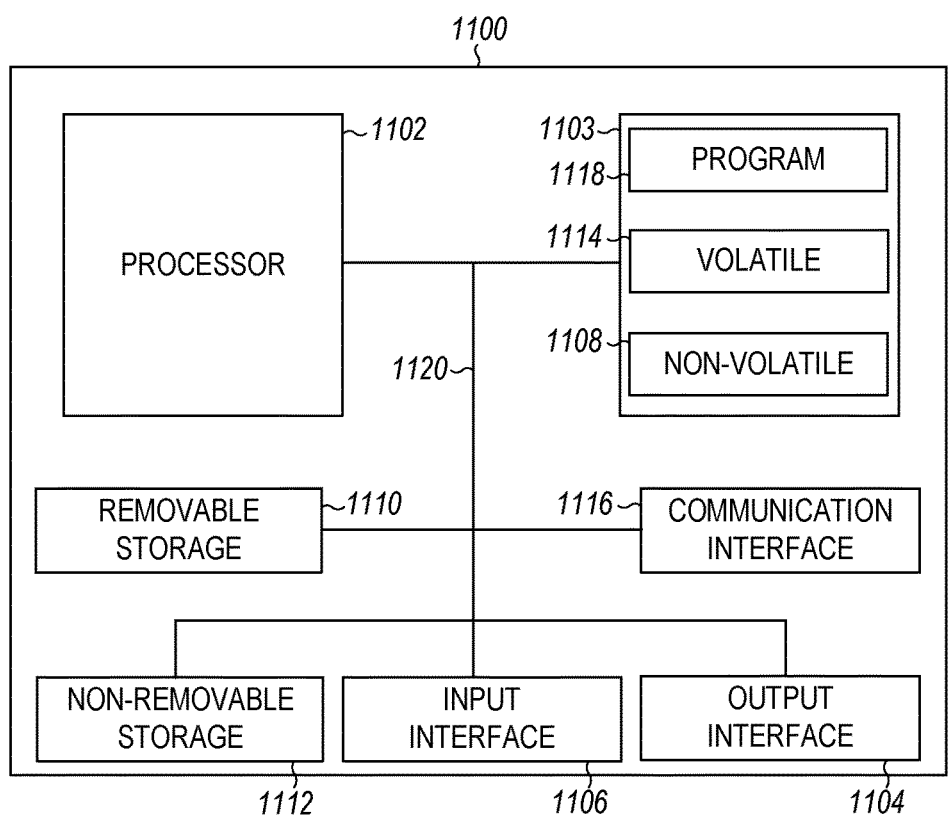
FIG. 11 is a block diagram illustrating circuitry for performing methods and algorithms according to an example embodiment.

FIG. 11 is a block diagram illustrating circuitry for CMs and CMTS devices and for implementing procedures and performing methods according to example embodiments. All components need not be used in various embodiments. For example, the clients, servers, and network resources may each use a different set of components, or in the case of servers for example, larger storage devices.

One example computing device in the form of a computer 1100 may include a processor or processing unit 1102, memory 1103, removable storage 1110, and/or non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices, such as smartphones, tablets, and smartwatches, are generally collectively referred to as mobile devices or user equipment. Further, although the various data storage elements are illustrated as part of the computer 1100, the storage may also or alternatively include cloud-based storage accessible via a network, such as the Internet or server based storage.

Memory 1103 may include volatile memory 1114 and/or non-volatile memory 1108. Computer 1100 may include—or have access to a computing environment that includes—a variety of computer-readable media, such as volatile memory 1114 and/or non-volatile memory 1108, removable storage 1110 and/or non-removable storage 1112. Computer storage includes random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input 1106, output 1104, and a communication connection or interface 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common network node, or the like. The communication connection may include a cable network, Local Area Network (LAN), a Wide Area Network (WAN), cellular, WiFi, Bluetooth, or other networks.

Computer-readable instructions stored on a computer-readable medium are executable by the processing unit 1102 of the computer 1100. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1118 may be used to cause processing unit 1102 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method implemented by a cable modem of a cable network, the method comprising:
a test cable modem receiving a broadcast interference group test granted transmission MAP message;
the test cable modem sending an upstream test signal during at least one interference testing minislot assigned to the test cable modem by the MAP message;
the test cable modem receiving downstream signals while other cable modems of the cable network send upstream test signals during respective allocated minislots;
the test cable modem measuring interference in the received downstream signals, the interference being generated from the upstream test signals sent by the other cable modems; and
the test cable modem reporting the interference measurement to a cable modem termination system.

2. The method of claim 1 wherein the interference measurement comprises a receive modulation error ratio (RxMFR) value with interference and without interference.

3. The method of claim 1 wherein the interference measurement comprises a capture symbol.

4. The method of claim 1 with the MAP message allocating minislots located in an Orthogonal Frequency Division Multiple Access (OFDMA) symbol.

5. The method of claim 4 further comprising the test cable modem parsing the MAP message to determine at least one minislot to use for broadcasting the upstream test signal.

6. The method of claim 1 with the test cable modem reporting the interference measurement for each received test signal in a report message.

7. A cable modem of a cable network, the cable modem comprising:
a memory storage comprising instructions; and
a processor in communication with the memory, the processor executing the instructions to:
receive a broadcast interference group test granted transmission MAP message, the MAP message designating the cable modem as a test cable modem;
send an upstream test signal during at least one interference testing minislot assigned to the test cable modem by the MAP message;
receive downstream signals while other cable modems of the cable network send upstream test signals during respective allocated minislots;
measure interference in the received downstream signals, the interference being generated from the upstream test signals sent by the other cable modems; and
report the interference measurement to a cable modem termination system.

8. The cable modem of claim 7 wherein the interference measurement comprises a receive modulation error ratio (RxMFR) value with interference and without interference.

9. The cable modem of claim 7 wherein the interference measurement comprises a capture symbol.

10. The cable modem of claim 7 with the MAP message allocating minislots located in an Orthogonal Frequency Division Multiple Access (OFDMA) symbol.

11. The cable modem of claim 10 with the test cable modem parsing the MAP message to determine at least one minislot to use for broadcasting the upstream test signal.

12. The cable modem of claim 7 with the test cable modem reporting the interference measurement for each received test signal in a report message.

13. A cable modem of a cable network, the cable modem comprising:
 a memory storage comprising instructions;
 a communication device configured to couple to the cable network; and
 a processor in communication with the memory storage and the communication device, the processor executing the instructions to:
  receive a broadcast interference group test granted transmission MAP message, the MAP message designating the cable modem as a test cable modem;
  send an upstream test signal during at least one interference testing minislot assigned to the test cable modem;
  receive downstream signals while other cable modems of the cable network send upstream test signals during respective allocated minislots;
  measure interference in the received downstream signals, the interference being generated from the upstream test signals sent by the other cable modems; and
  report the interference measurement to a cable modem termination system.

14. The cable modem of claim 13 wherein the interference measurement comprises a receive modulation error ratio (RxMER) value with interference and without interference.

15. The cable modem of claim 13 wherein the interference measurement comprises a capture symbol.

16. The cable modem of claim 13 with the MAP message allocating minislots located in an Orthogonal Frequency Division Multiple Access (OFDMA) symbol.

17. The cable modem of claim 16 with the test cable modem parsing the MAP message to determine at least one minislot to use for broadcasting the upstream test signal.

18. The cable modem of claim 13 with the test cable modem reporting the interference measurement for each received test signal in a report message.

19. A method comprising:
 a Cable Modem Termination System (CMTS) broadcasting an interference group test granted transmission MAP message to multiple cable modems coupled to the CMTS via a cable network;
 the CMTS selecting a cable modem to be a test cable modem;
 the CMTS causing each of the other cable modems to perform as signaling cable modems transmitting a test signal in at least one minislot responsive to the MAP message; and
 the CMTS receiving an interference measurement from the test cable modem reports from the multiple cable modems representative of interference detected responsive to the test signals from the multiple cable modems, wherein interference groups are assignable based on the received reports.

20. The method of claim 19 wherein the minislots are located in an Orthogonal Frequency Division Multiple Access (OFDMA) symbol.

21. A method comprising:
 a Cable Modem Termination System (CMTS) selecting a cable modem from multiple cable modems to be a test cable modem, the multiple cable modems coupled to the CMTS via a cable network;
 the CMTS broadcasting an interference group test granted transmission MAP message to the multiple cable modems, with the multiple cable modems comprising the test cable modem and remaining cable modems, the CMTS causing the remaining cable modems to transmit an upstream test signal in at least one minislot responsive to the MAP message; and
 the CMTS receiving an interference measurement reports from the test cable modem, the interference measurement being generated responsive to the upstream test signals transmitted by the other cable modems, wherein interference groups are assignable based on the received reports.

22. The method of claim 21, further comprising:
 the CMTS performing the selecting, broadcasting, and receiving for a second test cable modem to generate a second interference measurement; and
 creating at least one interference group based on the interference measurement and the second interference measurement.

23. The method of claim 21 with the minislots located in an Orthogonal Frequency Division Multiple Access (OFDMA) symbol.

* * * * *

UNITED STATES PATENT AND TRADEMARK OFFICE
CERTIFICATE OF CORRECTION

PATENT NO. : 10,630,401 B2
APPLICATION NO. : 15/701805
DATED : April 21, 2020
INVENTOR(S) : Zhang et al.

It is certified that error appears in the above-identified patent and that said Letters Patent is hereby corrected as shown below:

In the Claims

In Column 12, Line 27, in Claim 1, delete "modern" and insert --modem-- therefor In Column 12, Lines 30-31, in Claim 2, delete "(RxMFR)" and insert --(RxMER)-- therefor In Column 12, Line 43, in Claim 7, delete "modern" and insert --modem-- therefor In Column 12, Line 65, in Claim 8, delete "(RxMFR)" and insert --(RxMER)-- therefor In Column 13, Line 36, in Claim 14, delete "(RxMFR)" and insert --(RxMER)-- therefor In Column 14, Line 27, in Claim 21, delete "moderns" and insert --modems-- therefor Signed and Sealed this
First Day of December, 2020

Andrei Iancu
*Director of the United States Patent and Trademark Office*